United States Patent [19]

Poor

[11] Patent Number: 5,672,060
[45] Date of Patent: Sep. 30, 1997

[54] APPARATUS AND METHOD FOR SCORING NONOBJECTIVE ASSESSMENT MATERIALS THROUGH THE APPLICATION AND USE OF CAPTURED IMAGES

[75] Inventor: David D. S. Poor, Meadowbrook, Pa.

[73] Assignee: Meadowbrook Industries, Ltd., Delran, N.J.

[21] Appl. No.: 345,214

[22] Filed: Nov. 28, 1994

Related U.S. Application Data

[63] Continuation of Ser. No. 911,663, Jul. 8, 1992, abandoned.
[51] Int. Cl.⁶ .............................. G06K 9/00; G06K 9/60
[52] U.S. Cl. ..................... 434/322; 382/321; 434/353
[58] Field of Search ................................. 382/321

[56] References Cited

U.S. PATENT DOCUMENTS

| | | | |
|---|---|---|---|
| 4,004,354 | 1/1977 | Yamauchi | 434/336 |
| 4,205,780 | 6/1980 | Burns et al. | 235/459 |
| 4,671,772 | 6/1987 | Slade et al. | |
| 4,760,246 | 7/1988 | Shepard | 235/454 |
| 4,798,543 | 1/1989 | Spiece | |
| 4,867,685 | 9/1989 | Brush et al. | |
| 4,895,518 | 1/1990 | Arnold et al. | |
| 4,937,439 | 6/1990 | Wanninger et al. | 235/456 |
| 4,978,305 | 12/1990 | Kraft | 434/353 |
| 5,002,491 | 3/1991 | Abrahamson et al. | |
| 5,003,613 | 3/1991 | Lovelady et al. | 382/17 |
| 5,011,413 | 4/1991 | Ferris et al. | 434/358 |
| 5,035,625 | 7/1991 | Munson et al. | 434/362 |
| 5,038,392 | 8/1991 | Morris et al. | 382/317 |
| 5,054,096 | 10/1991 | Beizer | 382/61 |
| 5,101,447 | 3/1992 | Sokoloff et al. | 382/61 |
| 5,103,490 | 4/1992 | McMillin | 382/62 |
| 5,119,433 | 6/1992 | Will | 382/61 |
| 5,134,669 | 7/1992 | Keogh et al. | 382/62 |
| 5,140,650 | 8/1992 | Casey et al. | 382/9 |
| 5,147,205 | 9/1992 | Gross et al. | |
| 5,151,948 | 9/1992 | Lyke et al. | 382/7 |
| 5,204,813 | 4/1993 | Samph et al. | |
| 5,258,855 | 11/1993 | Lech et al. | 382/61 |
| 5,302,132 | 4/1994 | Corder | |
| 5,418,865 | 5/1995 | Bloomberg | 382/317 |
| 5,437,554 | 8/1995 | Clark et al. | |

FOREIGN PATENT DOCUMENTS 9005970  5/1990  WIPO .

*Primary Examiner*—Wellington Chin
*Assistant Examiner*—Jean B. Corrielus
*Attorney, Agent, or Firm*—Reed Smith Shaw & McClay

[57] ABSTRACT

An apparatus and method are provided for scoring nonobjective assessment materials recorded on paper, such as essays, by displaying digitized images of the assessment materials on computer screens for scoring by human scorers. A digitized image of the assessment material is captured by scanning an assessment form and storing the image in an electronic file. The stored digitized image is displayed to the scorer and a score entered by the scorer is returned to a scoring center where reports are generated. Embodiments of the invention include capturing the image in association with Optical Mark Reading (OMR), capturing identifying information through OMR, training and testing the scorer by displaying images of anchor items and validity items for scoring. A series of computer data files ensure control of the scoring process.

25 Claims, 13 Drawing Sheets

WRITING ESSAY ASSESSMENT FORM

SECTION 1: ????????????

FIG. 1

ESSAY: USE THE SPACE BELOW FOR YOUR FINAL ESSAY. BE SURE TO WRITE OR PRINT CLEARLY AND FOLLOW THE INSTRUCTIONS CAREFULY. BE SURE TO KEEP YOUR WRITTEN ESSAY WITHIN THE RED BORDER.

SCRATCH AREA: USE THE SPACE WITHIN THE BLUE BORDER BELOW FOR YOUR OUTLINE, NOTES, ETC.

ESSAY: USE THE SPACE BELOW FOR YOUR FINAL ESSAY. BE SURE TO WRITE OR PRINT CLEARLY AND FOLLOW THE INSTRUCTIONS CAREFULLY. BE SURE TO KEEP YOUR WRITTEN ESSAY WITHIN THE RED BORDER.

SCRATCH AREA: USE THE SPACE WITHIN THE BLUE BORDER BELOW FOR YOUR OUTLINE, NOTES, ETC.

*FIG. 5*

Joseph H. McMann
124 Rosewood Drive
Harrisonburgh, IL  6126

Dear Customer:

In cooperation with UNISCORE, Incorporated, we are surveying our clients to determine their wants and needs for new software.

In addition to specialized software for users of laser printers, we have the latest in OMR systems software and now we can even provide full support for the capture and use of images of assessment information, name and address fields, signatures, and other hand-written data. Output options include on-screen display, laser printed reports, and compressed bit-mapped images in TIFF format.

Your assistance in this project is appreciated.

MeadowBrook Industries, Ltd.

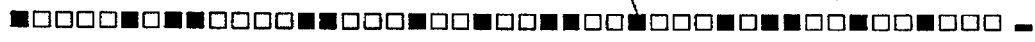

*FIG. 10*

NAME _____
ADDRESS _____
CITY _____ STATE _____ ZIPCODE _____
                              34

*FIG. 11*

SCANNED DATA FILE

Records contain fixed-length 1118 character data and are in the standard UNISCORE test scoring format.

```
POSITIONS   LENGTH   CONTENTS   DESCRIPTION
==================== Project identification ==================
   1  -  55     55       A-N         UNISCORE internal control fields
============ UNISCORE student identification key ==========
  56  -  59      4       A-N         Job Number or district code
  60  -  61      2       A-N         Grade (KK,01..12)
  62  -  63      2       A-N         School Code
  64  -  65      2       NUM         Class code
  66  -  67      2       A-N         Sequence number code within class
         68      1        A          Blank for school/class headers
                                     'X' for student
============ Student/group identification field ==========
  69  -  91     23        A          School/Classroom/or student name
  92  -  99      8       A-N         Date of Birth (normally MM/DD/YY)
 100  - 108      9        N          Student number (0-9 or blank)
 110  - 117      9       A-N         Optional codes
        118      1        A          Sex (M, F, or blank)
============== Test specific items =======================
 119  - 1118   1000      A-N         Item buffer
                                     Objective items: 1..9 for valid responses
                                         ' ' for omit, '-' for multiples
                                     Image offsets: 8-digit image file offset
                                         or all blank if no response*
```

*FIG. 12*

The assessment control file consists of a series of ASCII records in formats as shown below. Records may be variable or fixed-length.

Line 1: DataFile Specifications
    1 - 4 = Project Code
    5..End = Filespec for Assessment Scoring File(s): If includes or *, will
        be a file selection from files meeting specification, otherwise
        will be exact file name including suffix.
            Specific file: [drive:][path\]filename
            Selection:    [drive:][path\]filemask Line 2: Project title specification
    1..End = Project Title Line 3..n: Field Specifications
    A set of field specifications is defined for each potential assessment.
    Each process must contain at least one "Image Field" and one "Score
    Field". In the set of field specifications, four types of fields can be
    defined: Image, selection, Display, and Score IMAGE FIELD
    1-2 = Assessment Number
    3 = Field Type 'I'
    4-6 = Location of image offset in
    7-8 = Image index in Assessment
        records (01,02,03....)
    9-11 = Filler
    12-46 = Description of assessment SELECTION FIELD
    1-2 = Assessment Number
    3 = Field Type 'L'
    4-6 = Location of selection data in
        scanned data record
    7-8 = Number of values listed
    9-10 = Length of selection field
    11 = Selection flag: I=Include if
        field present, X=Exclude if
        present, N=exclude if not
        present
    12-46 = Selection values (e.g. num=4,
        len=2: 01020399)

DISPLAY FIELD: Display constant data
    1-2 = Assessment Number
    3 = Field Type 'D'
    4-6 = '000'
    7-10 = filler
    11 = Orientation: "L"=Left
        "C"=Centered  "R"=Right
    12-46 = Text or title to display DISPLAY FIELD: Display student data
    1-2 = Assessment Number
    3 = Field Type 'D'
    4-6 = Location of data to be
    7-8 = Location of data in 30 char
        student display data
    9-10 = Data record field length
    11 = filler
    12-46 = Text or title to display to
        left of student data SCORE FIELD
    1-2 = Assessment Number
    3 = Field Type 'S'
    4-6 = Location of scored results in
        student scanned record
    7-8 = Location of scored results in
        40 character score field
    9-10 = Length of scored results
    11 = filler
    12-26 = Limit of valid responses (e.g.
        01-12,XX  1-5,9,U)
    27-46 = Text or title to display

*FIG. 13*

ASSESSMENT SCORING FILE

```
POSITIONS  LENGTH  CONTENTS  DESCRIPTION
=================== Project identification =================
   1 -   4    4      A-N     Project code
         5    1      AL      Constant ':'
============ UNISCORE student identification key ==========
   6 -   9    4      A-N     Job Number or district code  ⎫
  10 -  11    2      A-N     Grade (KK,01..12)            ⎬ 35
  12 -  13    2      A-N     School Code                  ⎪
  14 -  15    2      NUM     Class code                   ⎭
  16 -  17    2      A-N     Sequence number code within class
============ Project assessment identification key ==========
  18 -  19    2      NUM     Assessment or essay number (sequence 01..99)
        20    1      A       STATUS FLAG: b=Pending. X=Completed,
                             T=Training item, Q=Quiz Item, A=Anchor item
================= Scoring assignment & Results ==============
**** 21 -  70 : Initially blank: Scoring for first scorer
  21 -  24    4      A-N     Scorer code # 1
  25 -  26    2      NUM     Scorer file number (sequential 01..99)
  27 -  28    2      NUM     Sequence within scorer file
  29 -  68   40      A-N     Score results
  69 -  70    2      b       Filler
**** 71 - 120 : Initially blank: Scoring for second scorer
  71 -  74    4      A-N     Scorer code # 1
  75 -  76    2      NUM     Scorer file number (sequential 01..99)
  77 -  78    2      NUM     Sequence within scorer file
  79 - 118   40      A-N     Score results
 119 - 120    2      b       Filler
**** 121 - 170 : Initially blank: Scoring for third scorer
 121 - 124    4      A-N     Scorer code # 1
 125 - 126    2      NUM     Scorer file number (sequential 01..99)
 127 - 128    2      NUM     Sequence within scorer file
 129 - 168   40      A-N     Score results
 169 - 170    2      b       Filler
```

File is indexed on first 19 positions.

FIG. 14

SCORER BATCH FILE

```
POSITIONS  LENGTH  CONTENTS  DESCRIPTION
================== Scorer Identification ==================
  1 -   4     4     A-N      Scorer code # 1
  5 -   6     2     NUM      Scorer file number (sequential 01..99)
  7 -   8     2     NUM      Sequence within scorer file
================= Assessment Identification =================
  9 -  11     2     A-N      Assessment number
       20     1     A        A=Anchor/S=Score or quiz item
 21 -  28     8     NUM      Image Offset: Image # 1
 29 -  36     8     NUM      Image Offset: Image # 2
 37 -  44     8     NUM      Image Offset: Image # 3
 45 -  52     8     NUM      Image Offset: Image # 4
=================== Score results fields ===================
 55 -  92    40     A-N      Score results
 93 - 132    40     A-N      Lowest valid scores: Anchor records only
133 - 172    40     A-N      Highest valid scores: Anchor records only
173 - 200    28     A-N      Display data from scanned record
```

Image Offsets grouped as 36. Score results marked 37. Lowest/Highest valid scores grouped as 38.

Essentially the same format will be used for training materials:

```
POSITIONS  LENGTH  CONTENTS  DESCRIPTION
================== Training Identification ==================
  1 -   4     4     A-N      Project code
  5 -   6     2     NUM      Training file number (sequential 01..99)
  7 -   8     2     NUM      Sequence within training file
================= Assessment Identification =================
  9 -  11     2     A-N      Assessment number
       20     1     A        Constant 'A'
 21 -  28     8     NUM      Image Offset: Image # 1
 29 -  36     8     NUM      Image Offset: Image # 2
 37 -  44     8     NUM      Image Offset: Image # 3
 45 -  52     8     NUM      Image Offset: Image # 4
=================== Score results fields ===================
 55 -  92    40     A-N      filler
 93 - 132    40     A-N      Lowest valid scores
133 - 172    40     A-N      Highest valid scores
173 - 200    28     A-N      Display data: Comments
```

*FIG. 15*

APPARATUS AND METHOD FOR SCORING NONOBJECTIVE ASSESSMENT MATERIALS THROUGH THE APPLICATION AND USE OF CAPTURED IMAGES

This is a continuation of application Ser. No. 07/911,663, filed Jul. 8, 1992 now abandoned.

BACKGROUND OF THE INVENTION

This invention relates to an apparatus and method to score or grade nonobjective assessment materials recorded on paper, such as handwritten essays. More particularly, the invention relates to apparatus and methods for scoring such materials using captured images, or digital representations of the original materials.

Systems for scoring assessment materials (i.e. multiple choice or true/false questions), where a student records answers often using a No. 2 pencil to darken an oval in a grid in a preprinted machine-readable form, are well known. Such systems typically use optical mark reading technology to translate the student's recorded responses into an electronic data file in a computer system. Scoring nonobjective assessment materials, typically essay examination answers recorded on paper, presents a greater technological challenge than scoring objective assessment materials, because the student is not limited to selecting one of several preselected answers and the student is not restricted to recording the answer in a small space, such as the oval on a typical preprinted, machine-readable form. Accordingly, nonobjective assessment materials are typically scored or graded by human scorers (or readers), who read the answer on the answer sheet submitted by the student. The present invention provides an apparatus and method (system) for scoring nonobjective assessment materials that builds upon known systems for scoring objective assessment materials.

Optical Mark Reading (hereinafter OMR) is a technique by which "marks" on paper documents are "read" or identified by means of optical equipment. Marks can be detected optically by the absence or presence of light: if sufficient light is reflected by the paper at a specific location, there is no mark. If sufficient light is absorbed that the intensity of the light is significantly reduced, a mark is detected. Marks are typically made to indicate a response, reaction, opinion, name, title, or other information. Marks are often made in "grids" of responses corresponding to letters, digits, alphanumeric codes, test item responses, etc. In some cases, marks are made by machines: when the documents are first produced, i.e. printed by a forms printer, marks may be "filled in" to identify the document type and/or provide a unique number for the specific document. In some cases, a computer controlled printer may be used to fill in marks, such as to complete sections that would otherwise need to be completed by a person. Although they have many applications, OMR forms are most widely used for recording answers to multiple choice tests. Other applications include surveys, questionnaires, inventory control, and the like.

OMR systems process marks located in predetermined locations, or "response positions". Most OMR equipment is designed to read a specific "matrix" of such marks, typically with a fixed number of responses per inch in both the horizontal and vertical directions. Typical matrices include "6 by 6" (i.e. six responses per inch on a row of responses, and six lines or rows per inch), "6 by 8", "6 by 5", and "8 by 6". Once the equipment has detected the presence of a mark at a specific location, an appropriate character, code, or value is stored for subsequent processing. OMR processing permits extremely accurate, extremely rapid capture of information, especially when each response can be entered with a single mark or response. All other methods of data capture from paper documents, such as key-entry or optical character recognition, require much more extensive electronic or manual processing.

Image capture refers to the process of capturing, in digital form, an electronic image of an entire document or parts thereof and of storing the image for processing, retrieval and display, or other purposes. Image capture for digital storage and retrieval measures and records the light reflected by a form at discrete points. Images can be captured using hand-held scanners, low volume sheet scanners, or high volume sheet scanners. Image capture permits high-resolution (100 dots per inch or higher) capture, storage, and retrieval of visual information such as handwritten essays or other nonobjective assessment materials. Once an image is captured, the digitized image can be distributed, displayed, printed, or processed without reverting back to the original source document.

For nonobjective assessment materials, scorers or readers examine the student materials and make a judgement concerning how well the student has completed the assigned task. Since such judgements can be arbitrary, a major part of any scoring involves training scorers to grade materials consistently and accurately.

One method of having materials scored is to have the student's teacher grade the materials. However, this method has very low scorer reliability and may be subject to personal bias or bias arising from the teacher's expectations. As a result, most state-mandated nonobjective assessment is scored or graded outside the normal school setting. Traditionally such grading is done primarily for writing samples, such as short essays. Large numbers of scorers, generally referred to as "readers" for writing samples, are assembled at a central site for training and scoring.

In this traditional method of scoring, team leaders and scorers are trained using manuals and samples of writing samples extracted from those students have completed. Scorers are tested using other selected writing samples submitted by students to see that the scorers are making proper judgements. All of the writing samples are kept at the scoring site, and "batches" of samples are given to scorers to read and grade. The traditional method requires management of large amounts of paper, especially the student writing samples. Moreover, maintaining high scorer reliability, i.e. ensuring that all scorers are making proper judgements, is difficult using the traditional method.

SUMMARY OF THE INVENTION

It is an object of the present invention, to use image capture methods to capture and store an image of the nonobjective assessment materials to subsequently display on computer screens for scoring.

It is another object of the invention to provide a method of displaying an image of assessment materials and processing scores or judgements, which eliminates many of the problems associated with traditional scoring methods.

It is a further object of the invention, to provide a system in which student identification and other information is captured through Optical Mark Reading, OMR, while the images of the assessment materials are captured using image capture techniques. It is a still further object of the invention to provide a system wherein images of materials to be scored are distributed to scorers throughout a diverse geographic area, while providing superior reliability, security, and accountability.

The present invention provides an apparatus and method of scoring nonobjective assessment materials through the use of digitized images depicting the responses made for the assessment. Such digitized images are displayed on computer screens for scoring or making judgements of the assessment materials.

Through the use of captured images as the representation of the student's work, the presentation of a captured image in lieu of the original material eliminates the need to manage and control large amounts of paper in a secure manner with large numbers of people involved. The student responses can be kept secure at the scanning center, and do not need to be handled again for any part of the scoring process. Since there are no names or other identifying information sent to scorers with the images of the materials to be scored, student anonymity is assured.

By transferring data files, programs, control files, and files containing images of materials to be scored, by telecommunications link or overnight courier service, scorers can be utilized throughout a diverse geographic area. This will permit a more selective choice of scorers, since the potential pool of scorers will be greatly enlarged. This process will also eliminate the need for a large scoring center such as a conference center.

Sample assessment responses used for training (anchor items), and sample assessment responses used to test the accuracy of scorer judgements (validity items), are presented to scorers on computer screens, so that the scorer cannot distinguish these items from other student items. Accordingly, anchor items and validity items can be intermixed with regular student items for scoring. This permits constant monitoring of scorer judgement accuracy and offers a mechanism for retraining when needed, thus improving scorer reliability.

Since groups of students' materials do not need to be kept together, batches can be comprised of materials from students in different classrooms, schools, and school systems, thus eliminating the chance of setting a biased expectation for a group of students.

This invention describes apparatus and methods to score assessment materials using digitized images of the original documents, instead of the original documents. This invention further describes procedures to distribute images of assessment materials stored in digital form so that scoring judgements can be made by viewing the images of the assessment materials on computer screens. This invention describes subsequent procedures to merge the results of such scoring with other student information so that individual and aggregate reports can be prepared.

In a preferred embodiment, this invention utilizes Image Capture in combination with OMR, to capture the assessment data from completed assessment forms. The assessment scoring or judgements are entered directly onto the computer screen on which the images are displayed. In a currently contemplated embodiment of this invention, diskettes of images and associated data files will be sent to scorers over a wide geographic area, and a series of computer files will be used to control the flow of the captured images and the scores or judgements that are made in the scoring process.

DESCRIPTION OF THE DRAWINGS

There are seen in the drawings, forms of the invention which are presently preferred and which constitute the best mode contemplated for carrying the invention into effect. It should be understood that the invention is not limited to the precise arrangements and instrumentalities shown.

FIG. 1 depicts an exemplary assessment material response form with identification fields and objective test items suitable for the demonstration of this invention.

FIG. 2 depicts an exemplary form with an area for recording an open-ended assessment such as an essay.

FIG. 4 depicts the exemplary form of FIG. 1 with completed identification and objective test items.

FIG. 5 depicts the exemplary form of FIG. 2 with an essay handwritten in the assessment area.

FIG. 10 depicts a personalized OMR form having laser-printed name and address and codes to identify the addressee.

FIG. 11 depicts an identification area suitable for key-entry.

FIG. 12 is a table showing the record-layout currently used for the Scanned Data File for objective and nonobjective assessment applications.

FIG. 13 is a table showing the record-layout currently used for the Assessment Control File for nonobjective assessment applications.

FIG. 14 is a table showing the record-layout currently used for of the Assessment Scoring File for nonobjective assessment applications.

FIG. 15 is a table showing the record-layout currently used for the implementation of the Scorer Batch File for nonobjective assessment applications.

DETAILED DESCRIPTION OF THE INVENTION

Figure 1:
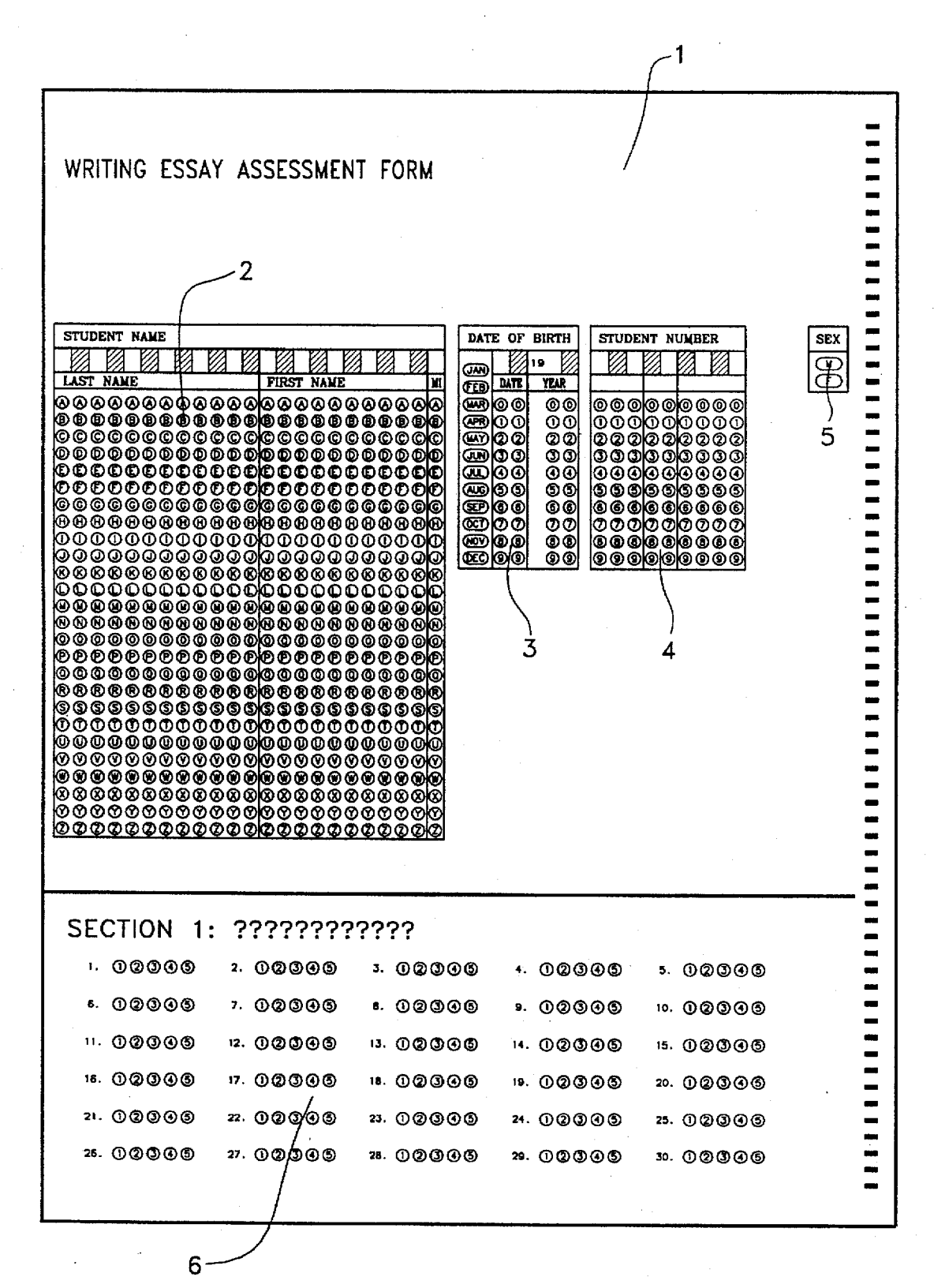
Figure 3:
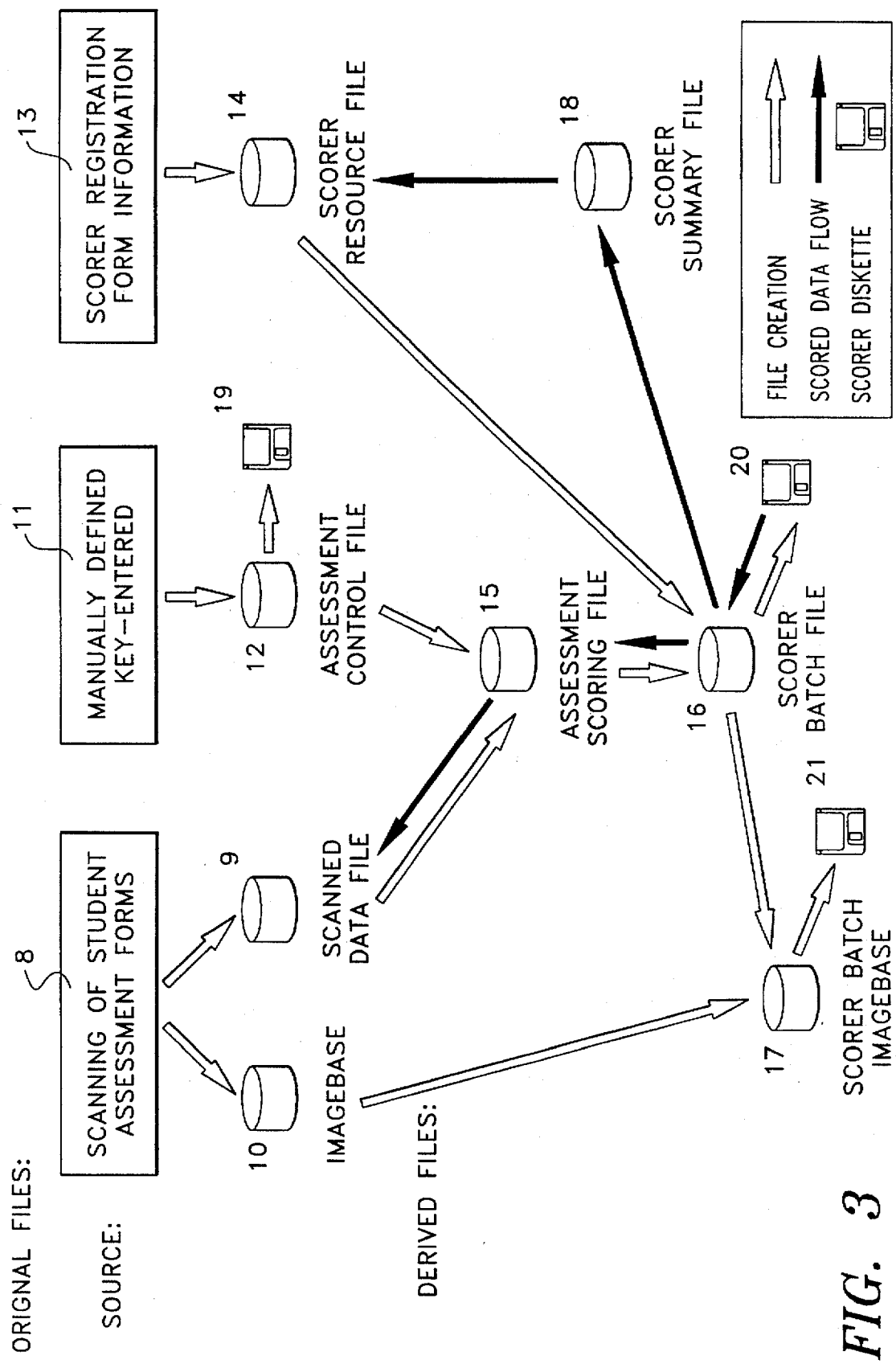
FIG. 3 is a flow diagram, depicting, in broad concept, the interrelationship among the computer files used in processing nonobjective assessment materials.

Referring now to the drawings in detail, wherein like reference numerals indicate like elements, there is seen in FIG. 1 and FIG. 2, a form 1 suitable for the recording of nonobjective assessment materials on paper. This invention is described in the context of the scoring essays, such as are given for graduation tests or other competency tests. However, as will be apparent to those skilled in the art, the invention has wider applicability to wide variety of nonobjective assessment. The information fields 2–6 in FIG. 1 are appropriate for processing by OMR, and the assessment area 7 in FIG. 2 is appropriate for image capture.

The student or person completing the nonobjective assessment test or evaluation ("assessment material") fills in an appropriately designed paper form 1. This form may be one or more pages long and will typically consist of (a) a single sheet of paper, typically 8½ by 11", (b) a response "folder" consisting of one 11×17" sheet of paper folded in half to yield a two-page folder of two sheets of 8½ by 11, or (c) a response booklet consisting of two or more 11×17" sheets of paper folded and stapled over the folds to yield a 4, 6, 8 or more sheets of 8½ by 11".

Typically, form 1, will contain a field in which the respondent can fill in his or her name and other information. In the exemplary form 1, fields are presented in which the respondent can complete his or her name 2, date of birth 3, student number 4, and sex 5. Each of these fields is suitable for processing with OMR, and OMR provides the preferred method of capturing such identification as discussed below.

FIG. 10 discloses an alternative method of identifying the respondent using a "turnaround document". In this alternative method, the form 31 containing the identifying information, is completed before being provided to the respondent. In the example depicted, the form is appropriate for OMR processing although other methods could be used. In the example in FIG. 10, the respondent's name and address 32 are printed on the form (preferably using laser printer technology) along with a series of codes 33 from which an identifying number for the respondent can be derived. Once the respondent's identifying number is known, the respondent's name, address and other information can be derived from existing data files.

Figure 11:
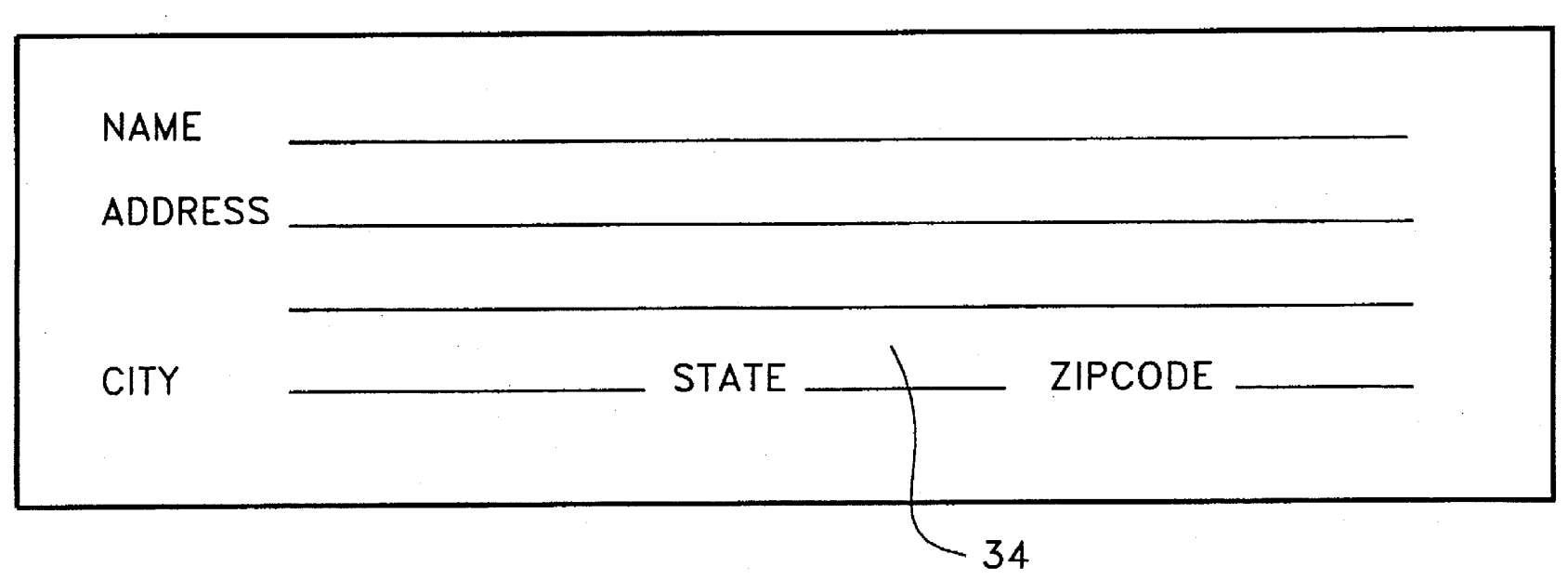

FIG. 11 discloses a third method of identifying the respondent using traditional key-entry procedures (or keying of captured images as disclosed in the prior application "IMAGE CAPTURE AND STORAGE TECHNIQUES IN ASSOCIATION WITH OPTICAL MARK READING".) For this method, the assessment form can contain the identification and the nonobjective assessment on a sheet of paper. In this example, the identifying information is handwritten in a response area 34, the handwritten information is captured using image capture, and is subsequently converted to machine-readable text by key-entry procedures based on the displayed captured image.

SCANNING COMPLETED FORMS

Images are typically captured and converted to digital representations using equipment (scanners) specifically designed for the task. In an embodiment of this invention preferred for inexpensive, low volume applications, a handheld scanner or low volume sheet scanner can be used. In an embodiment preferred for larger volume applications, a specially modified Optical Mark Reading device is used to capture the image of the entire page or document, and then the image of the portion of the document containing the assessment material is stored for subsequent retrieval and use as described in commonly assigned co-pending U. S. patent application Ser. No. 07/759,396, now abandoned the disclosure of which is hereby incorporated by reference.

In the scoring of nonobjective assessment materials, OMR can be used to detect marks in areas designated for recording the assessment materials, assessment areas. In these assessment areas, OMR response positions are not indicated on the document, and a person completing the assessment materials on the document need not be aware that his or her responses will be processed utilizing OMR. OMR is used to detect the presence of marks in the assessment areas, and image capture processes are applied for that portion of the assessment areas in which marks are detected. By applying image capture processes to only the portion of the assessment are in which marks are detected, the process runs faster and consumes less file storage space.

In a preferred embodiment, traditional OMR techniques are used to capture the identifying information of the respondent (e.g. student name, student number, sex, grade, etc.), and any objective test items which may be included as part of the overall assessment process (e.g. multiple-choice items). Other data processing techniques, including key-entry and keying of images can be used in lieu of OMR, but OMR provides the most cost effective and accurate process for capturing identifying and controlling information as text or characters.

By combining the use of image capture technologies and image processing with OMR, a hybrid process can be employed providing better functionality than OMR or image capture and image process alone, as discussed in commonly assigned, co-pending U. S. patent application Ser. No. 07/759,240, the disclosure of which is hereby incorporated by reference.

Storage Of Captured Images

Figures 6, 7:
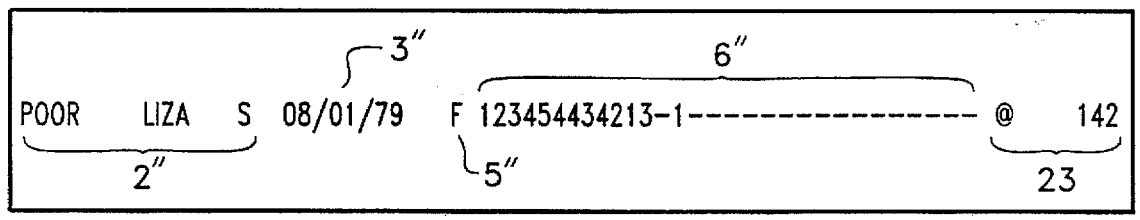
FIG. 6 presents a portion of a data record resulting from scanning a single sheet of paper with the form shown in FIG. 4 on the front and the form shown in FIG. 5 on the back.
FIG. 7 is a reproduction of a laser-printed image of the image captured from scanning the form depicted in FIG. 5.

Results of traditional optical mark reading (OMR) are stored in digital form with a single "record" for each document read. FIG. 6 depicts a partial data record. Within this record, specific fields contain the characters, codes, or values to reflect the particular marks detected on the document. In combining image processing with OMR, images are also saved in digital form.

In the embodiments of the present invention, captured images can be stored in a variety of formats, each of which is based on a series of measurements of the light reflected off of the paper in a grid pattern. A measurement is made in each cell of the grid, such measurements defining one dot, or one pixel. Typically such a grid should define at least 100 lines per inch, and 100 columns per inch resulting in at least 100 dots per inch in the horizontal and vertical dimensions. Each pixel can be stored as a single on-off, or binary value, thereby yielding a black and white representation of the original material. Alternatively, each pixel can be stored as a number, typically of four bits (yielding sixteen possible values) or of eight bits (yielding 256 possible values). With each pixel stored as one of a range of values, a gray-scale representation of the original material can be presented. Finally, images can be stored with a set of three numbers for each pixel yielding a color representation of the original material.

In a preferred embodiment, images are stored as black and white, or binary bit-mapped representations of the original assessment materials. For some applications, such as the definition of a color wheel, alternative storage procedures may be preferred.

In a preferred embodiment of this invention, procedures are used as described in commonly assigned, copending U.S. patent application Ser. No. 07/759,240, "IMAGE CAPTURE AND STORAGE TECHNIQUES IN ASSOCIATION WITH OPTICAL MARK READING", the disclosure of which is hereby incorporated by reference. Based on the procedures described therein, the present invention uses a storage process permitting the storage of multiple images where each image is associated with specific data processing records based on sheets of paper scanned using OMR in a single "imagebase".

As described in the above-referenced application, two separate digital mass storage files are created. Referring to FIG. 3, the first file, referred to as the Scanned Data File 9, contains traditional OMR records with additional fields added to identify and locate images in the second file. The second file, hereinafter referred to as the ImageBase File 10, contains binary data to permit the reconstruction for display of the images. The contents of the second file may contain with multiple records of possibly varying lengths. This technique permits the efficient retrieval of the images of assessment materials associated with specific documents or students.

The Simplified Embodiment

Although the preferred embodiment of this invention uses several sophisticated techniques, a simplified embodiment of the invention, appropriate only for small numbers of assessment materials, could be realized using a hand-scanner (such as the Logitech, Inc. Scanman®) or simple sheet scanner (such as the Hewlett Packard ScanJet®), and a personal computer.

First, the scanner would be used to scan the assessment portion of the document, and the resulting digitized image would be stored in a file on the computer, utilizing software provided with the scanning hardware such as the ANSEL® "Image Editing Software" from Logitech. The operator would record the exact name of the file on the original document.

Each file would be transferred to a floppy disk, and then sent to readers or scorers who would record their judgements, either on a text data file on the same diskette, or in written form. In either case, scores or ratings would be identified with the name of the file containing the captured image, and then the scores would be returned. Subsequently, the scores would be manually recorded on the original document.

A slightly improved process would store the respondent's name, other identifying information, name of the file containing the captured image, and the resulting scores in an appropriate computer file.

The High Speed Embodiment

The particularly preferred embodiment differs from the above in several significant aspects. In the particularly preferred embodiment, (1) images are captured in association with Optical Mark Reading so that a data file 9 record and captured image are created in a single process, (2) multiple images from multiple documents are stored in a single "imagebase" file 10, (3) all record keeping is maintained in appropriate computer files, (4) sets of images are sent to scorers on diskettes 21, (5) judgements are recorded directly on the computer used to display the images, and (6) scored judgements are returned to be integrated with other judgements and data via computer communications.

Once the respondent has completed the input document 1, the document is scanned 8 using an appropriate device. The preferred embodiment of this invention utilizes specially modified OMR equipment and techniques as described in above-referenced U.S. patent application Ser. No. 07/759,396 to capture and store images. The preferred method for combining OMR and image capture is disclosed in above-referenced application Ser. No. 07/759,240 IMAGE CAPTURE AND STORAGE TECHNIQUES IN ASSOCIATION WITH OPTICAL MARK READING. In the preferred embodiment of this process, two files are created in the scanning process: (a) the Scanned Data File 9 of information derived from OMR processing, and (b) the ImageBase File 10 of captured images in digitized form. In the presently preferred embodiment, the Scanned Data Records are stored in a fixed-record format as shown in FIG. 12.

Figure 4:
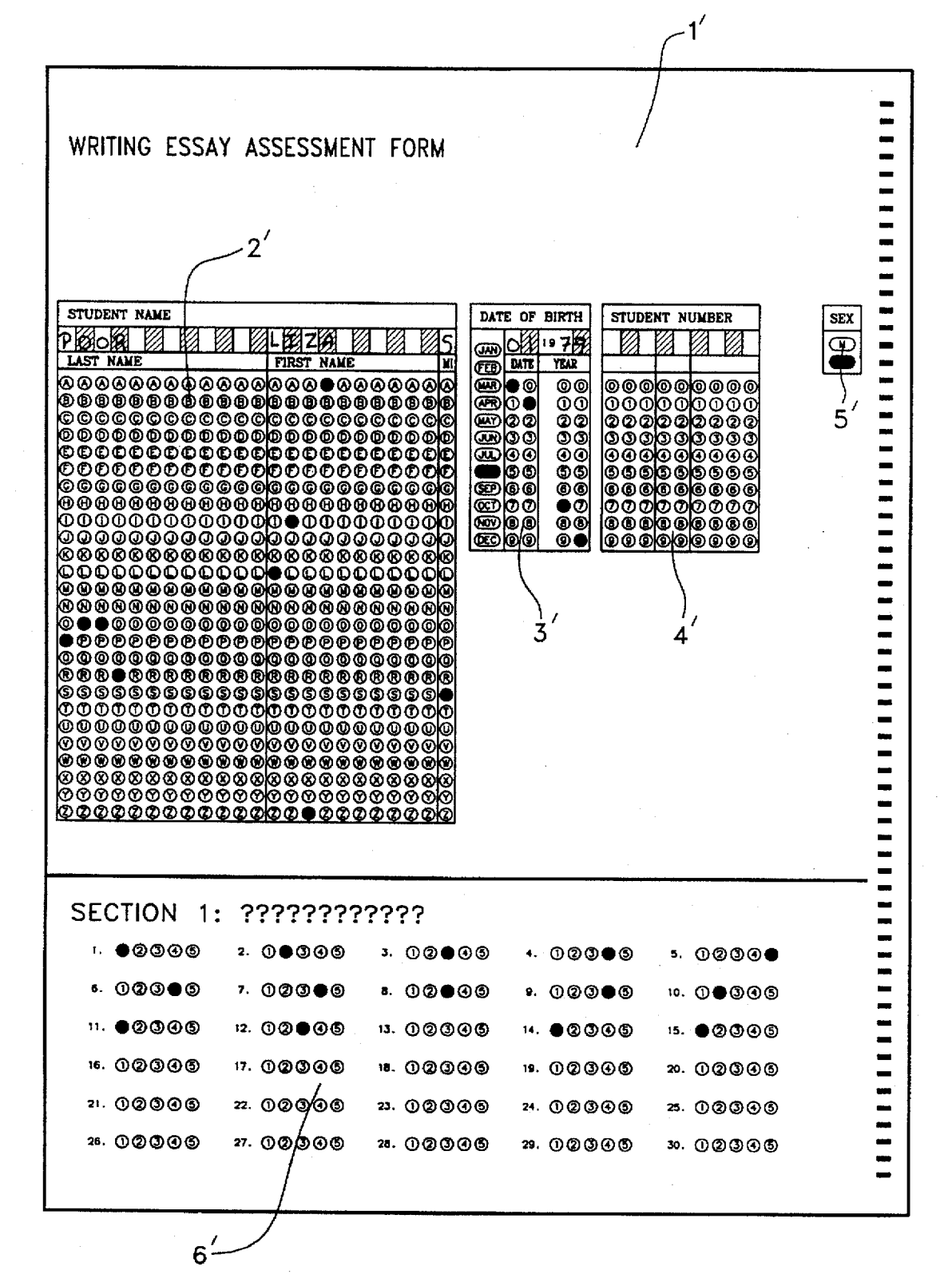

In the scanning process, completed identification fields, such as those depicted in FIG. 4, for Student Name 2', Date of birth 3', Student number 4', and sex 5', are processed, converted into characters representing the intended responses, and stored in the Scanned Data File 9 as represented in FIG. 6 which shows the resulting representation of the Student Name 2", Student Date of Birth 3", Student Number 4", and sex 5".

As completed objective test item responses or other OMR fields such as those depicted in FIG. 4, for objective test items 6', are scanned they are converted into characters representing the intended responses, and stored in the Scanned Data File 9 as represented in FIG. 6 which shows the resulting representation of the thirty (30) objective items 6".

Referring again to FIG. 3, for each respondent document scanned, a new captured image will be placed in the Image-Base file 10 whenever marks are detected in the assessment area. FIG. 5 shows a completed handwritten essay 22 in Assessment Area 7'. Each image in the imagebase file 10 is stored in digitized bit-mapped or compressed bit-mapped format with appropriate header or control information. FIG. 7 shows a laser-printed version 22' of the image of the handwritten essay 22. For each image, the location of the header, relative to the start of the imagebase file 10, is called the "offset" for that image and is stored in the Scanned Data Record 9. FIG. 6 shows such an offset represented as a numeric character string 23.

PREPARATION OF ASSESSMENT CONTROL FILE

Referring again to FIG. 3, an Assessment Control File 12 is created using a word processor, editor, or other similar file creation software 11, to control the data processing of the files. The contents of Assessment Control File 12 are shown in FIG. 13.

A copy of the Assessment Control file 12 is copied to diskette 19 and sent to the scorer.

PREPARATION OF SCORER RESOURCE FILE

Referring again to FIG. 3, potential scorers will be solicited and asked to complete a registration form 13. Information from such forms will be processed using one of (a) keyed data from non-scannable form, (b) scanned data from a scannable OMR form, or (c) data loaded directly from data keyed directly into a computer by the potential scorer. Scorer registration information is then loaded into a Scorer Resource File 14 that contains information for each potential scorer and may vary in content from project to project.

PREPARATION OF ASSESSMENT SCORING FILE

As shown in FIG. 3, the Assessment Scoring File 15 is built from the Scanned Data File 9, and the Assessment Control File 12. In the building process, a separate record is created for each assessment to be recorded for each scanned document. Each record contains information sufficient to identify the assessment and the scanned record. The presently preferred embodiment of this process also includes fields to score the results of scoring in the Assessment Scoring File 15 as shown in FIG. 14.

Once all or part of Assessment Scoring File 15 has been created, project managers or other specialists ("experts") will examine an arbitrary subset of the captured images to identify particular assessment responses appropriate for training and reliability functions. Selected items will be coded in Assessment Scoring File 15 as "Training" or "Validity" items. A correct score or grade will be entered for each training or validity item based on the experts' judgements.

USE OF SCORER DISKETTES AND TELECOMMUNICATIONS

Displaying Assessment Data

Figure 8:
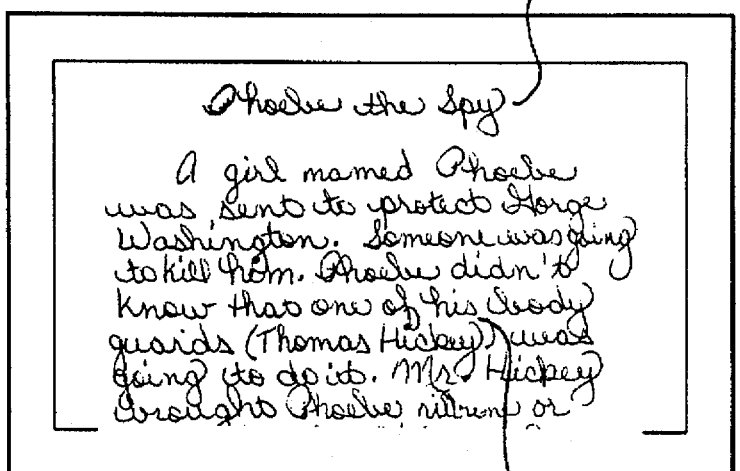
FIG. 8 depicts a computer screen displaying the image captured from scanning the form depicted in FIG. 5 in a format appropriate for grading or scoring.

When a scorer or reader receives a set of images to be scored 21, the files containing the images will be placed in the scorer's computer. Typically such files will be copied to the scorer's computer's hard drive or mass storage media. Either under manual control or under program control, as depicted in FIG. 8 the several images 25 are displayed on the computer screen 24 one at a time so that the reader or scorer can examine the image of the written materials.

In a preferred embodiment, each scorer's "batch" consists of a series of images stored in a single file referred to as the scorer batch Imagebase 17. A companion file, suitable for traditional data processing, contains one record corresponding to each image in the scorer imagebase file of images. This companion file provides sequencing and identifying information for each image as well as the location of the corresponding image in the imagebase file and the locations in which the scorer's judgements can be stored. This companion file is called the scorer batch file 16 as shown in FIG. 15. In the preferred embodiment of this invention, both files are copied to diskette 20, 21 and sent to the scorer.

Whenever possible, the capture process should be set up so that the full width of the assessment material's image can be viewed on the screen at one time. If the length of the image exceeds the vertical display capability of the computer monitor, a method is desirably included to smoothly "scroll" the image up and down on the screen so that the entire image can be easily viewed by the scorer.

Scoring On Screen

Figure 9:
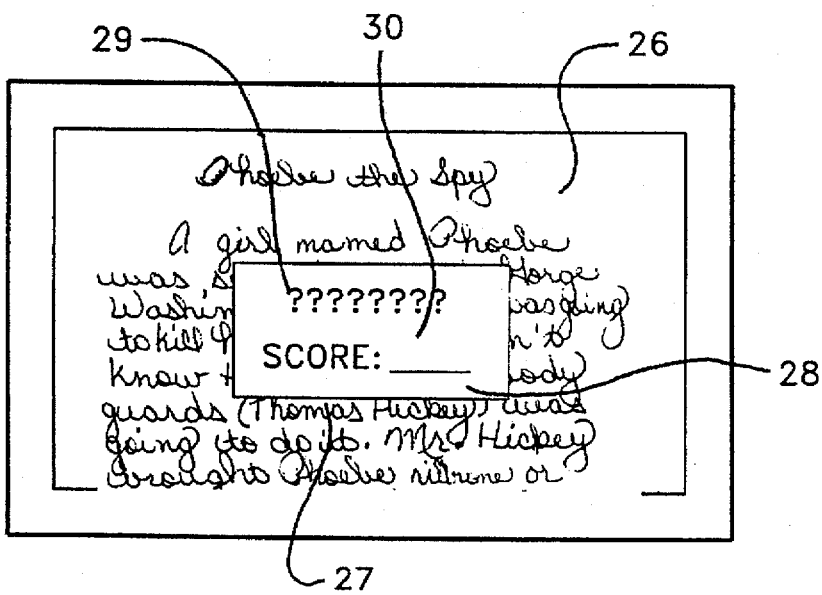
FIG. 9 depicts a computer screen displaying the image captured from scanning the form depicted in FIG. 5 with a data-entry field suitable for entering a score for the displayed image.

The present invention provides a process of recording judgements using the same computer on which the image is displayed. In this process, when a scorer or reader is ready to record his or her judgement, the scorer presses a key on the computer keyboard to call up a "window" 28 in which judgements can be displayed as depicted in FIG. 9. Then, by entering appropriate digits or codes using the keyboard, the scorer can record the judgements 30. The entered judgements are simultaneously displayed with appropriate identifying information 29 in the window on the computer screen.

Scorers can score images displayed either on a series of interconnected computer screens (e.g. a local area network) or on a series of independent (non-interconnected) computers. The presently preferred embodiment uses a series of non-interconnected computers so that scorers can work at home or at other remote locations, instead of being assembled at a centralized location.

There are two primary methods to transfer data files to dispersed locations: telecommunications and diskettes. Because the imagebase files 10 contain large amounts of data, even when compressed, the length of long-distance communications connections needed for all but the fastest communications protocols would be prohibitively expensive for most applications. Therefore transferring diskettes via mail or courier service is currently preferred.

There are three major methods by which scorers could record their scores: on forms which are not machine-readable, on machine-readable forms, or directly on the computers on which the images are displayed. The third method is presently preferred, because the results can easily be sent back to the central site using telecommunications and thereby minimizing delay.

PREPARATION OF SCORER BATCH FILES

Sets of items will be selected for each scorer from Assessment Scoring File 15. At least one set will be made up exclusively of training items so that the scorer can become familiar with the scoring criteria. Another set will be made up predominantly of validity items so that the scorer can demonstrate mastery of the scoring procedures so that they become eligible to be sent materials for actual scoring. The requirements will vary from project to project, but will typically require at least 80% correct scoring of the validity items.

Only after a scorer has demonstrated mastery by correctly scoring training items, will the scorer have access to assessment materials to score. Referring to FIG. 3, a Scorer Batch File 16 will be prepared for the scorer based on information in his or her record in the Scorer Resource File 14. Depending on information on the scorer, a series of records are prepared from information in the Assessment Scoring File 15 consisting of images that have not been scored, anchor items, and/or validity items. The record layout for the Scorer Batch File 16 is shown in FIG. 15.

At the same time that the Scorer Batch File 16 is created, the Student Key Information fields 35 in the Assessment Scoring File 2 are used to access the corresponding records in the Scanned Data File 9. From the Scanning Data File 9, the offsets for each image are obtained. Based on these offsets, the corresponding records are read from the Image-Base file 10. These images are then stored in a special Scorer ImageBase File 17. The corresponding new offset for each image in the Scorer ImageBase File 17 is saved in the corresponding record of the Scorer Batch File 16 in the appropriate Image Offset field location 36.

TRAINING MATERIALS FOR SCORERS

The same process will be used for both training scorers and for scoring assessment materials: scorers will be provided data files containing the assessment materials. Scorers will view then the images of the assessment materials on their computer screens, record their judgements which will be stored in the corresponding records of the scorer batch file 16 in score results fields 37, and return their recorded judgements to the scoring center either on disk on via data communications.

Scorers will be provided with manuals describing the operation of programs used with scoring and specific instructions for grading the assessment items in the particular project. In addition to studying these written materials, the bulk of the training will be with the same scoring computer program that will be used for scoring of actual student assessment materials.

Referring again to FIG. 3, Scorers will be sent a diskette containing both the data files needed for training and the data files needed to demonstrate that they have mastered the scoring task 20, 21. Scorers will be sent a copy of the Assessment Control File 12 on diskette 19. This file will be used for all Scorer Batch Files throughout the project.

For training, at least one special Scorer Batch File 16 and corresponding Scorer ImageBase File 17 will be created consisting exclusively of anchor items and copied to diskette 20 and 21. As the scorer makes judgements on these items, immediate feedback on the accuracy of his or her judgements will be presented on the screen based on the information in the Scorer Batch File score results fields for Anchor items 38.

QUALIFYING FOR SCORING

To demonstrate mastery of the training materials, scorers will be sent at least one special Scorer Batch File 16 and corresponding Scorer ImageBase File 17 consisting exclusively of validity items and copied to diskette 20 and 21. After the scorer makes judgements on these items, he or she will transmit the file back to the central site. A summary of these returned validity items will be placed in the Scorer Summary File 18. If performance on the validity items meets or exceeds minimum qualifying standards, the scorer will be deemed ready for scoring, and an appropriate indication will be made in the scorer's record of the Scorer Resource File 14.

PROCESSING SCORED RESULTS

For typical Scorer Batch Files 16 and corresponding Scorer ImageBase Files 17 sent on diskette to the Scorer, the scorer will make judgements on all assessment items. If an assessment item is an anchor item, the scorer will be provided with immediate feedback on the accuracy of his or her judgement. If an item is a validity item or a normal student item, the score will be stored in the Scorer Batch File 16 in the Score Results fields 37.

Once all items have been scored, the Scorer Batch File 16 will be returned to the central office, normally through telecommunications. When the file is received, summary statistics will be calculated and posted to the corresponding scorer record in the Scorer Summary File 18. Only if performance on embedded validity items is in an acceptable range will the scorer be deemed to be reliable and the assessment judgements on student items transferred to the Assessment Scoring File 15, 37.

DISPUTE RESOLUTION

The system can be expanded to any requirement for multiple judgements on each assessment item. In the presently and preferred embodiment, however, there are provisions for each assessment item to be scored twice.

If the scores from the first two scorers agree, then, as shown in FIG. 3, the student's score will be transferred from the Assessment Scoring File 15 to the Scanned Data File 9.

If the first two scores do not agree, then a third score will be made by a staff member or expert scorer. This third scoring will constitute a tie-breaker to determine the student's score.

REPORTING

Once all judgements have been transferred to the Scanned Data File, individual and aggregate reports (i.e. average score, mean, standard deviation) will be generated.

The present invention may be embodied in other specific forms without departing from its spirit or essence. Accordingly, reference should be made to the claims rather than the foregoing specification as indicating the scope of the invention.

I claim:

1. A method of electronically displaying to a human scorer an image of handwritten nonobjective assessment materials recorded by a test taker in an assessment area of an assessment form, and recording a score entered by the scorer, comprising the steps of:

providing an assessment form having thereon at least one assessment area;

recording in an electronic file information identifying the test taker;

recording in an electronic file information identifying the assessment form;

capturing from the assessment form a digitized image of said assessment materials recorded in the at least one assessment area;

storing said digitized image in an electronic image file;

recording in an electronic file information to locate said stored image of said assessment materials;

selectively displaying electronically said stored image of said assessment materials but not said information identifying the test taker on a computer screen for scoring by the scorer; and recording in an electronic file a score entered by the scorer for the stored digitized image of the assessment materials.

2. A method in accordance with claim 1, wherein the digitized image is stored as a bit-mapped image.

3. A method in accordance with claim 1, wherein the stored digitized image is converted to a bit-mapped image and stored as a compressed bit-mapped image.

4. A method in accordance with claim 1, wherein said step of capturing a digitized image comprises the further steps of:

identifying the form by OMR;

determining the location of at least one of the assessment areas on the form;

determining by OMR whether marks readable by OMR are present within the at least one assessment area;

determining by OMR the portion of the at least one assessment area in which marks are present; and storing in digital form the image of the portion of the at least one assessment area that was determined to contain marks.

5. A method in accordance with claim 1, wherein said step of storing said digitized image further comprises a step of recording the locations in a data file of the digitized image comprising the steps of:

creating a companion data file; and creating a separate record in the companion data file for each assessment form containing one or more digitized images, the separate record having the location of the digitized image specified as an offset from the start of the file containing the digitized image.

6. A method in accordance with claim 5, wherein the step of creating a separate record further comprises the step of providing a second companion data file and storing information identifying the test taker in the second companion data file.

7. A method in accordance with claim 5, wherein the step of storing information identifying the test taker further comprises the step of capturing information from the assessment form using OMR.

8. A method in accordance with claim 1, further comprising the steps of:

creating and storing in computer memory training items having the same format as said digitized image; and displaying said items to the scorer in the same format as items to be scored.

9. A method in accordance with claim 1, further comprising the steps of:

creating and storing in computer memory assessment responses having the same format as said digitized image; and supplying and displaying said assessment responses to the scorer in the same format as items to be scored, whereby said assessment responses serve as validating items for testing the accuracy of the scorer's selection of scores.

10. A method in accordance with claim 1, wherein the process of displaying the digitized image further comprises the steps of:

transferring to a scorer an image file containing the image to be displayed and a companion data file including an offset so that the image can be located in the image file;

locating the image to be displayed;

reading the digitized image from the file; and converting the image to a form appropriate for display on a computer screen.

11. A method in accordance with claim 1, wherein the process of displaying the digitized image comprises the steps of:

transferring to a scorer at a remote site the image file containing the image to be displayed and a companion data file for locating the image in the image file;

locating the image to be displayed;

reading the digitized image from the image file; and converting the image to a form appropriate for display on a computer screen at the remote site.

12. A method in accordance with claim 1, wherein the step of recording a score further comprises the step of entering the score in a field displayed on the same computer screen used to display the image.

13. A method in accordance with claim 9 further comprising the steps of:

providing a main scoring center;

transferring the recorded score for a validity item to the main scoring center; and using the transferred score to determine scorer validity.

14. A method in accordance with claim 1, further comprising the steps of:

provided a scoring site and a main scoring center, said recording step being performed at the scoring cite;

transferring the recorded score to the main scoring center; and associating in a computer file, the transferred score with the identity of the person who completed the assessment material.

15. A method in accordance with claim 14, further comprising the step of merging the recorded score transferred to the main scoring center with the respondent identification to produce scoring reports.

16. A method of displaying images of handwritten nonobjective assessment materials to a human scorer and recording the scores recorded by the scorer, comprising the steps of:

capturing digitized images for a plurality of assessment materials;

storing the digitized images in a computer file;

displaying a first subset of the digitized images on a computer screen for scoring by the scorer to train the scorer;

displaying a second subset of the digitized images on a computer screen for scoring by the scorer to test the scorer's selection of scores; and displaying additional digitized images on a computer screen for scoring by the scorer to provide scores for the assessment materials represented by the additional images; and recording in an electronic file scores entered by the scorer for the digitized images.

17. A method in accordance with claim 16, further comprising the steps of:

designating the first subset of the digitized images as anchor items to be used for training scorers;

assigning one or more valid scores for each of the anchor items;

said step of displaying a first subset comprising displaying the digitized images of the anchor items on a computer screen for scoring by the scorer as a training technique;

recording the score selected by the scorer for each anchor item;

comparing the score selected by the scorer to the values assigned as valid for each anchor item; and informing the scorer as to the accuracy of the selected score for each anchor item.

18. A method in accordance with claim 16, further comprising the steps of:

designating the second subset of the digitized images as validity items to be used for testing the accuracy of the scorer's selection of scores;

recording the score selected by the scorer for a validity item;

providing a control scoring center;

transferring the score selected by the scorer to the central scoring center;

comparing the score selected by the scorer to the values assigned as valid; and determining the accuracy and reliability of the scorer's performance on the set of validity items, to determine eligibility to score the assessment materials.

19. A method in accordance with claim 16, wherein the step of displaying the digitized image further comprises the steps of:

transferring to a scorer at a remote site, the file containing a set of images to be displayed and a companion data file so that the image can be located;

locating the image to be displayed;

reading the digitized image from the file; and converting the image to a form appropriate for display on a computer screen.

20. An apparatus for displaying to a human scorer an image of handwritten assessment materials recorded by a test taker in an assessment area of an assessment form and for recording a score selected by the scorer, comprising:

input means for capturing from the assessment form a digitized image of the assessment materials to be scored, said means for capturing a digitized image comprising:

means for storing the digitized image in an electronic file;

means for selectively displaying the digitized image on a computer screen for the scoring by the scorer;

means for electronically recording a score entered by the scorer for the digitized image;

means for identifying the form by OMR;

means responsive to said means for identifying the form for determining the location of the assessment area;

means for determining by OMR the presence of marks within the assessment area of assessment materials recorded by the test taker and the portion of the assessment area in which marks are present; and means for storing in digital electronic form as part of an image file an image of at least the portion of the assessment area in which assessment materials are present.

21. A method of displaying to a human scorer an image of handwritten nonobjective assessment materials recorded by a test taker in an assessment area of an assessment form, and recording a score entered by the scorer, comprising the steps of:

providing an assessment form having thereon at least one assessment area;

capturing a digitized image of said assessment materials recorded in at least one assessment area in digital form from the assessment form;

storing said digitized image in a computer file;

displaying said digitized image of the assessment materials on a computer screen for scoring by the scorer; and recording a score entered by the scorer for the digitized image of the assessment materials;

said step of capturing a digitized image comprising the further steps of:

identifying the form by OMR;

determining the location of at least one assessment area on the form based on said step of identifying the form by OMR;

determining by OMR whether marks are present within said at least one assessment area;

determining by OMR the portion of said assessment area in which marks are present; and storing in digital form the image of the portion of the assessment area in which it was determined that marks are present.

22. A method of displaying no a human scorer images of handwritten nonobjective assessment materials recorded in an assessment area of an assessment form and recording scores recorded by the scorer, comprising the steps of:

capturing digitized images for a plurality of assessment materials;

storing the digitized images in a computer file;

displaying a first subset of the digitized images on a computer screen for scoring by the scorer to train the scorer;

displaying a second subset of the digitized images on the a computer screen for scoring by the scorer to test the scorer's selection of scores; and displaying additional digitized images on the computer screen for scoring by the scorer to provide scores for the assessment materials represented by the additional images;

said step of capturing digitized images comprising the further steps of:

determining by OMR the location of the assessment area on the assessment form, the presence within the assessment area of assessment materials and the location within the assessment area of said assessment materials; and storing in electronic form an image of at least said location within the assessment area in which said assessment materials are present.

23. An apparatus for electronically displaying to a human scorer an image of handwritten assessment materials recorded by a test taker in an assessment area of an assessment form and for recording a score selected by scorer, comprising:

an electronic file for storing identifying information to identify the test taker;

input means for capturing from the assessment form a digitized image of the assessment materials to be scored, said means for capturing a digitized image comprising:

an electronic image file for storing the digitized image;

means operatively connected to said image files for selectively displaying the digitized image but not the identifying information on a computer screen for scoring by the scorer;

means for electronically recording a score entered by the scorer for the digitized image;

said input means having means for identifying by electronic optical scanning the assessment form;

means for determining by electronic optical scanning the location of the assessment area on the assessment form, the presence within the assessment area of assessment materials recorded by the test taker, and the location within the assessment area of said assessment materials; and means for storing in electronic form as part of said image file an image of at least said location within the assessment area in which said assessment materials recorded by the test taker are present.

24. Apparatus in accordance with claim 23, and a second image file, said second image file comprising means for electronically storing training items, said training items comprising data for simulating the appearance of assessment materials recorded by a test taker; and means for selectively displaying a digitized image of said training items on a computer screen for scoring by the scorer, whereby the scorer may be trained by scoring said training items.

25. Apparatus in accordance with claim 23, and an additional image file, said additional image file comprising means for electronically storing assessment items to be scored by a human scorer, said assessment items comprising a subset of previously scored assessment materials used to train the human scorer and having the appearance of assessment materials recorded by a test taker; and means for selectively displaying a digitized image of said assessment items on a computer screen, whereby the scoring by said scorer of said assessment items can be used to verify the accuracy of the scorer's assignment of scores.

* * * * *